(12) United States Patent
Kim (10) Patent No.: US 11,119,869 B2
(45) Date of Patent: Sep. 14, 2021

(54) AUXILIARY STORAGE DEVICE PROVIDING INDEPENDENT BACKUP AND RECOVERY FUNCTIONS AND APPARATUS EMPLOYING SAME

(71) Applicant: Deok Woo Kim, Seoul (KR)

(72) Inventor: Deok Woo Kim, Seoul (KR)

(*) Notice: Subject to any disclaimer, the term of this patent is extended or adjusted under 35 U.S.C. 154(b) by 0 days.

(21) Appl. No.: 16/628,495

(22) PCT Filed: Apr. 30, 2018

(86) PCT No.: PCT/KR2018/005002
§ 371 (c)(1),
(2) Date: Jan. 3, 2020

(87) PCT Pub. No.: WO2019/009510
PCT Pub. Date: Jan. 10, 2019

(65) Prior Publication Data
US 2020/0133799 A1 Apr. 30, 2020

(30) Foreign Application Priority Data
Jul. 5, 2017 (KR) .................. 10-2017-0085508

(51) Int. Cl.
*G06F 11/14* (2006.01)
*G06F 9/4401* (2018.01)

(52) U.S. Cl.
CPC ........ *G06F 11/1469* (2013.01); *G06F 9/4406* (2013.01); *G06F 11/1448* (2013.01); *G06F 11/1471* (2013.01)

(58) Field of Classification Search
CPC .............. G06F 11/1469; G06F 9/4406; G06F 11/1448; G06F 11/1471; G06F 21/568

USPC ........................................................ 714/15
See application file for complete search history.

(56) References Cited

U.S. PATENT DOCUMENTS

| | | | |
|---|---|---|---|
| 6,577,912 B1 | 6/2003 | Ueda et al. | |
| 8,839,024 B2 | 9/2014 | Cho | |
| 2002/0133747 A1 | 9/2002 | Ravid | |
| 2004/0236984 A1 | 11/2004 | Yamasaki | |

(Continued)

FOREIGN PATENT DOCUMENTS

| | | | |
|---|---|---|---|
| JP | 2002-049534 A | 2/2002 | |
| JP | 2002-278816 A | 9/2002 | |
| JP | 2008-016001 A | 1/2008 | |

(Continued)

OTHER PUBLICATIONS

International Search Report for PCT/KR2018/005002 dated Sep. 27, 2018 [PCT/ISA/210].

*Primary Examiner* — Yair Leibovich
(74) *Attorney, Agent, or Firm* — Sughrue Mion, PLLC (57) ABSTRACT

An auxiliary storage device is disclosed. The device provides independent backup and recovery functions: enables easy use by attaching a commercialized auxiliary memory device in existing computers; minimizes of access time to the auxiliary memory device; enables automatic backup of data in a computer auxiliary memory device; recovers original data from a specific time using data that has been backed up through a simple operation when data on the auxiliary memory device has been damaged; and performs a recovery function for the auxiliary memory device by rebooting using backed-up OS information as needed.

15 Claims, 4 Drawing Sheets

(56) References Cited

U.S. PATENT DOCUMENTS

2013/0047038 A1* 2/2013 Huang ............... G06F 13/4022
714/38.1
2020/0319977 A1* 10/2020 Samarjai ............. G06F 3/0619

FOREIGN PATENT DOCUMENTS

| KR | 10-0865568 B1 | 10/2008 |
| KR | 10-2013-0011974 A | 1/2013 |
| KR | 10-1920866 B1 | 11/2018 |

* cited by examiner

AUXILIARY STORAGE DEVICE PROVIDING INDEPENDENT BACKUP AND RECOVERY FUNCTIONS AND APPARATUS EMPLOYING SAME

CROSS-REFERENCE TO RELATED APPLICATIONS

This application is a National Phase Application of PCT International Application No. PCT/KR2018/005002, which was filed on Apr. 30, 2018, and which claims priority from Korean Patent Application No. 10-2017-0085508 filed with the Korean Intellectual Property Office on Jul. 5, 2017. The disclosures of the above patent applications are incorporated herein by reference in their entirety.

BACKGROUND

1. Technical Field

The present invention relates to an auxiliary storage device providing independent backup and recovery functions, which enables ease of use by attaching a commercialized auxiliary storage device in existing computers, minimization of access time to the auxiliary storage device, automatic backup of data in a computer auxiliary storage device, recovery of original data from a specific time point using data that has been backed up through a simple operation when data on the auxiliary storage device has been damaged, and a recovery function for the auxiliary storage device to be performed by rebooting using backed-up operating system (OS) information as necessary.

2. Description of the Related Art

Recently, unintended encryption of user files and deletion of partitions or folders containing system recovery information by malicious codes such as ransomware are occurring. In the conventional computer architecture in which the entire system is controlled by one operating system (OS), when malicious codes such as hacking programs or computer viruses take control of the system as a top-level administrator, it is not possible to prevent the configuration of a system from being changed unintentionally.

In order to solve the above-described problems, the auxiliary storage device having an independent and selectively accessible recovery region by installing the separate processor on the auxiliary storage device so as to cope with the attack from malicious codes and to minimize damage to the system had been invented and filed as patent application (Korean Patent Application No. 10-2017-0061381, Title: AN AUXILIARY STORAGE DEVICE HAVING INDEPENDENT RECOVERY REGION, AND APPLIANCES ADOPTING THE SAME) by the inventor of this invention.

According to the above applied invention, it is possible to cope with the infection by malicious codes by preparing an isolated storage space which can be accessible only under strictly authorized condition, in an auxiliary storage device. However, the structure of the auxiliary storage device in the invention is complex, and the processor of the auxiliary storage device should take charge of both a communication control with the computer and tasks related to a storage media, therefore the access time of the auxiliary storage device may be increased. In particular, in recent years, since semiconductor auxiliary storage devices such as solid-state drives (SSDs) are more popular, faster access time is more preferable.

SUMMARY OF THE INVENTION

In order to solve disadvantages of above prior art, the present invention proposes a system and method in which, the communication control task with a computer and the management task of a storage space for coping with the infection from malicious codes are separated from each other to attach commercial existing auxiliary storage devices more easily and the access time of the auxiliary storage device can be minimized.

In one aspect of the present invention, at least one communication control unit and backup auxiliary storage device are newly adopted between computer unit and existing auxiliary storage device (hereinafter, referred to as an "original auxiliary storage device"). Computer unit accesses an auxiliary storage device through the communication control unit, so as to minimize an influence due to backup and recovery on an access speed of the original auxiliary storage device. Also, the auxiliary storage device of the present invention automatically backs up data in at least one backup auxiliary storage device which is independently connected to the communication control unit, recovers original data from a specific time point using data that has been backed up through a simple operation when the data on the original auxiliary storage device has been damaged, and performs a recovery function for the original auxiliary storage device by rebooting using backed-up operating system (OS) information stored in the backup auxiliary storage device as necessary.

That is, in the present invention, the original auxiliary storage device of the existing computer unit can be used without any change. And a separate communication control unit controls communication between the computer unit and the original auxiliary storage device, communication between the computer unit and the backup auxiliary storage device, and communication between the original auxiliary storage device and the backup auxiliary storage device, so as to minimize storage access time. Also, the backup auxiliary storage device creates backup information using data and information transmitted from the computer unit to the original auxiliary storage device and stores them, and thus copes with infection by malicious codes.

In this case, both of the original auxiliary storage device and the backup auxiliary storage device are connected to the computer unit through the communication control unit. A user may select an operation from a normal mode and a backup mode using a mode switch connected to the communication control unit or the backup auxiliary storage device. The computer unit is connected to the original auxiliary storage device in the normal mode and is connected to the backup auxiliary storage device in the backup mode.

Meanwhile, the communication control unit may be implemented by way of actively controlling communication with a separate processor provided therein or by way of passively controlling communication under control of the backup auxiliary storage device without a processor in it.

In case of actively controlling communication with a separate processor, the communication control unit also performs a function similar to that of a communication gateway. In this case, time delay may occur due to the processing of communication protocols, but there is an advantage in that the communication control unit may be applied without flow control problem. In such a way, the communication control unit communicates one-to-one (1:1) with the computer unit, the original auxiliary storage device, and the backup auxiliary storage device, respectively. When the backup function that is responsible for managing recovery information for backup is implemented on the backup auxiliary storage device, the mode switch is preferably connected to the backup auxiliary storage device. Therefore, the communication control unit operates by receiving a mode selection signal from the user through communication with the backup auxiliary storage device or through hard-wired input/output signal lines. Otherwise, when the backup function is implemented on the communication control unit, the mode switch may be connected to the communication control unit to operate. In this case, the backup auxiliary storage device operates passively. And for that reason, there is an advantage in that existing commercial products may be used for the backup auxiliary storage device. Meanwhile, the backup function may be implemented in the form of a program executed by a processor.

In case of passively controlling communication under control of the backup auxiliary storage device without a processor in the communication control unit, it is preferable that the backup auxiliary storage device receives data transmitted from computer unit to the original auxiliary storage device by branching a communication path between the computer unit and the original auxiliary storage device, because it does not affect the access speed of the original auxiliary storage device. Even though, since there is no channel used for transmission from the backup auxiliary storage device to the computer unit, a problem of flow control may occur, this problem can be easily resolved by using the backup auxiliary storage device with a sufficiently large communication buffer and than that of the original auxiliary storage device. Further, when a problem occurs in the flow control, the backup auxiliary storage device transmits a signal to the communication control unit to temporarily block the communication with the computer unit and the original auxiliary storage device and completes its own task and then resumes the communication so that the flow control is practically possible.

Meanwhile, as described above, the mode switch for the mode selection of the user may be attached to the backup auxiliary storage device or the communication control unit according to the structure thereof. When the user sets the mode switch to the normal mode, the user of the computer unit can access only the original auxiliary storage device. However, the communication control unit or the backup auxiliary storage device may monitor the communication therebetween and obtain necessary data. That is, when the computer unit accesses the original auxiliary storage device, and the communication control unit or the backup auxiliary storage device can monitor access information of the computer unit for the original auxiliary storage device in real time, create and store required recovery information, and create and update backup information in preparation for the infection by the malicious codes.

The communication control unit or the backup auxiliary storage device performs the backup task that records the access information including one of read/write selection information, access time, file path and file name, physical information such as a sector number, a cluster number, a cylinder number, and a head number, in an access list.

In the case of a read operation (computer unit←auxiliary storage device), the original auxiliary storage device transmits information as required by the computer unit, and thus a backup function is not performed. However, in the case of a write operation (computer unit→auxiliary storage device), a file system is changed, and thus the backup function is performed. The original auxiliary storage device completes the task by changing a designated file or contents of an area corresponding to the physical information on its storage medium, but in the backup auxiliary storage device, the above-described access information and data to be written are added in the access list without changing the contents of a designated sector or cluster. That is, the access record of the original auxiliary storage device of the computer unit is generated and stored in the backup auxiliary storage device. The communication control unit or the backup auxiliary storage device is in charge of the backup function.

In conventional computers, the access records are generated, stored and used for recovery in such a manner. However, since all of the records may be deleted in a top-level administrator mode of the computer, the present invention is significantly different from the above case in that deletion is impossible in the normal mode because recovery information including the access record is stored in an independent and physically separated space. The collected access records are provided for recovery or used to delete or monitor malicious codes.

When the computer malfunctions due to malicious codes or other reasons recovery process is performed. The user switches the mode switch to a recovery mode and reboots the computer unit. In this case, the communication control unit blocks access to the original auxiliary storage device of the computer unit and controls the backup auxiliary storage device to be connected to the computer. When the computer unit requests OS information for booting after the connection is set, the auxiliary storage device according to the present invention checks the contents of the backup auxiliary storage device and provides the contents when there is OS information backed up in past to enable booting. Further, when the computer unit requests various information for other application programs or for entering an initial state, the backup information is provided. If provided OS has been backed up some certain specific time which user designated, it is preferable that the backup information which was backed up at the same specific time is provided.

However, when there is no OS information in the backup auxiliary storage device, the recovery is performed by a recovery program on the BIOS. When the BIOS recognizes that the OS is not provided, it is also possible to automatically enter a recovery program mode. In this case, it is possible to determine whether the OS can be provided or not by referring to information of a specific sector of the backup auxiliary storage device by the BIOS. Or, entering the recovery program mode of the BIOS may be determined by the checking procedure, for confirming whether the OS is provided or not, in a communication protocol between the computer unit and the auxiliary storage device according to the present invention. The recovery program may be manufactured and provided as a function of the OS or as a separate application software.

When the OS or the application software is not backed up in the backup auxiliary storage device, it is possible for the recovery program of the BIOS to provide relevant information, such as the computer's ID and serial number, to OS and application software vendors to perform recovery on the computer over a network.

When the user selects a recovery time point through the recovery program, recovery of the original auxiliary storage device is performed using the access information up to the recovery time point. Recovery is performed by the communication control unit or the backup auxiliary storage device according to the configuration thereof. Regardless of which performs recovery process, it is possible to configure that this process runs without intervention of the computer unit, because of the original auxiliary storage device and the backup auxiliary storage device be practically connected to each other.

When the auxiliary storage device according to the present invention has a separate display and input device on which the recovery time point can be displayed, the user may perform recovery by selecting the recovery time point directly without intervention of the BIOS of the computer unit. In this case, the display and the input device may be added to the communication control unit or the backup auxiliary storage device according to the configuration thereof. Although the input device may be configured with a few physical switches, it is possible to consist of a keyboard interface, a mouse interface and the emulation interface for connecting those keyboard and mouse to the computer unit. A liquid-crystal display (LCD) is suitable as a display device.

Another aspect of the present invention provides a various types of computer unit (e. g. a personal computer or a laptop computer, personal digital assistant, a tablet PC, a pad, a mobile phone, a pager, an intelligent speaker, or a control device of an automobile/airplane/plant, etc.) to which the above-described auxiliary storage device is applied.

Still another aspect of the present invention provides, a method of configuring the auxiliary storage device providing independent backup and recovery functions, wherein the auxiliary storage device includes an original auxiliary storage device connected to a computer unit through a communication control unit and configured to store or provide data, a backup auxiliary storage device configured to store backup information, and a communication control unit configured to control communication between the computer unit and the original auxiliary storage device, communication between the computer unit and the backup auxiliary storage device, and communication between the original auxiliary storage device and the backup auxiliary storage device.

In this method, when a user sets a mode switch to a normal mode, the communication control unit controls the computer unit to access only the original auxiliary storage device, and the communication control unit or the backup auxiliary storage device uses such access information to perform the backup function. When the user switches the mode switch to a recovery mode and reboots the computer unit, the auxiliary storage device is controlled so that the access to the original auxiliary storage device of the computer unit is blocked and the backup auxiliary storage device is connected to the computer unit to perform a recovery operation.

The comprehensive configuration and operation of the present invention described above will be more apparent through preferable embodiments described below with reference to the accompanying drawings.

DETAILED DESCRIPTION OF THE INVENTION

Figure 1:
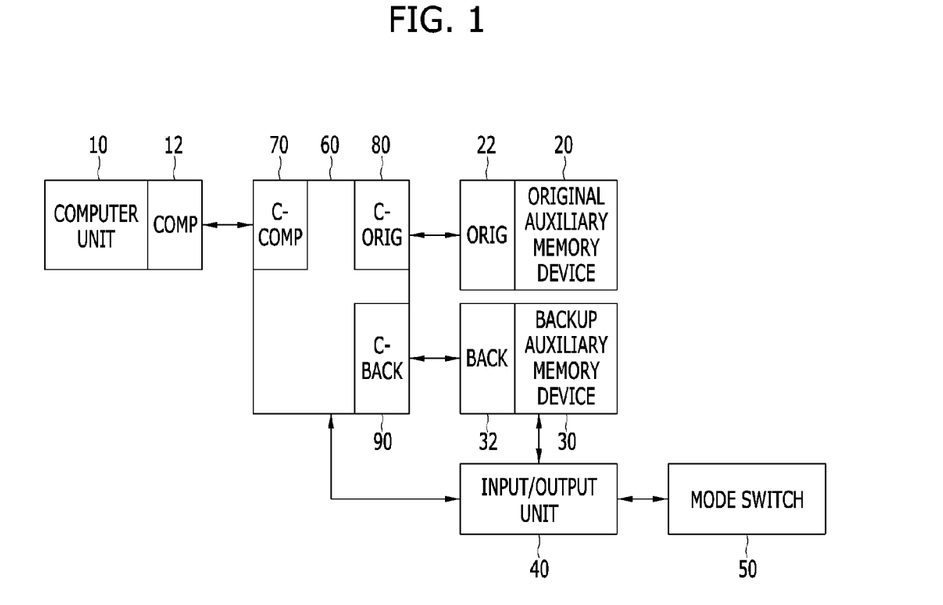
FIG. 1 is a schematic diagram of an auxiliary storage device according to an embodiment example of the present invention in which a communication control unit has a processor and only performs a function of a communication gateway.

FIG. 1 is a schematic diagram of an auxiliary storage device according to an embodiment of the present invention. A communication control unit 60 itself includes a separate processor (not illustrated) to actively operate and performs a function similar to that of a communication gateway. In this method, the communication control unit 60 communicates using one-to-one (1:1) connection with each of a computer unit 10, an original auxiliary storage device 20, and a backup auxiliary storage device 30. A backup function, which is a recovery information management task for backup, is provided in the backup auxiliary storage device, and a mode switch 50 is connected to the backup auxiliary storage device 30 through an input/output unit 40. The communication control unit 60 operates by receiving a mode selection signal from a user through communication with the backup auxiliary storage device 30 or through hardwired input and output signal lines.

The auxiliary storage device according to the present embodiment includes the original auxiliary storage device 20, which is connected to the computer unit 10 through the communication control unit 60 to store and provide data, and the backup auxiliary storage device 30 which stores backup information. The communication control unit 60 receives control signals outputted from the input/output unit 40 of the backup auxiliary storage device 30 and controls communication between the computer unit 10 and the original auxiliary storage device 20 and communication between the computer unit 10 and the backup auxiliary storage device 30. Here, the computer unit 10 refers to a computing related unit without an auxiliary storage device which contains an operating system (OS) and application programs in a conventional computing product such as a personal computer (PC) or a laptop computer, personal digital assistant (PDA), a tablet PC, a pad, a mobile phone, a pager, an intelligent speaker, or a control device of an automobile/airplane/plant, etc. In other words, in embodiments of present invention, auxiliary storage device may be HDD/SDD which is installed in computing product as well as separate storage device such as USB storage.

The backup auxiliary storage device 30 also receives a signal, which is received from the mode switch 50 for mode selection by the user, for selecting a normal mode or a recovery mode from the input/output unit 40. That is, in the backup auxiliary storage device 30, a processor (not illustrated) embedded therein receives a mode selection input from the mode switch 50 to control the communication control unit 60 or perform a predetermined task. The input/output unit 40 may include a display, an input key, or the like.

As described above, since the user of the existing computer has the computer unit 10 and the original auxiliary storage device 20, the user may prepare for infection of malicious codes by adding the device according to the present embodiment, which includes the communication control unit 60, the backup auxiliary storage device 30, the input and output unit 40, and the mode switch 50, to his or her own computer. The communication control unit 60 and the backup auxiliary storage device 30 may be connected and assembled as shown in FIG. 1 between a main board and an auxiliary storage device of the conventional computing product. Also, the computer may have the architecture when production as shown in FIG. 1.

When the user sets the mode switch 50 to the normal mode, the communication control unit 60, which controls the communication between the computer unit 10 and the original auxiliary storage device 20 and the communication between the computer unit 10 and the backup auxiliary storage device 30, allows the computer unit 10 to access only the original auxiliary storage device 20. However, in this case, the communication control unit 60 also allows the backup auxiliary storage device 30 to obtain required data. The computer unit 10 may freely access the original auxiliary storage device 20, and the backup auxiliary storage device 30 obtains access information of the original auxiliary storage device 20 of the computer unit 10 in real time to perform a backup task using those access information.

Meanwhile, when the computer malfunctions due to malicious codes or other reasons and the user determines that recovery needs to be performed on the computer, the user switches the mode switch 50 to the recovery mode and reboots the computer unit 10. In this case, the communication control unit 60 blocks access to the original auxiliary storage device 20 of the computer unit 10 and controls the backup auxiliary storage device 30 so that the backup auxiliary storage device 30 is connected to the computer unit 10.

As illustrated in FIG. 1, the computer unit 10, the original auxiliary storage device 20, and the backup auxiliary storage device 30 have a communication interface COMP 12, a communication interface ORIG 22, a communication interface BACK 32, respectively.

Before giving a detailed explanation, to aid in understanding, a general connection structure of a computer and an auxiliary storage device is to be introduced. Generally, auxiliary storage devices are connected to dedicated interfaces of a computer unit. A widely used method is an interface connection method according to Serial Advanced Technology Attachment (SATA) standards. In order to provide one-to-one (1:1) communication so that a computer can use multiple auxiliary storage devices, the above method requires multiple independent SATA interfaces. The above method provides independent input communication lines and output communication lines. Two differential communication lines, such as RX+ and RX− lines, and TX+ and TX− lines, are used as the communication lines. Further, the SATA protocol has a flow control function that is configured so that the computing unit and the auxiliary storage device may process a large amount of data at high speed. In the auxiliary storage device according to the embodiment of the present invention, there may be a slight effect on the access time of the original auxiliary storage device according to the flow control. However, commercialized auxiliary storage devices with the existing SATA interface may be used as the original auxiliary storage device in this exemplary embodiment of the present invention. Also, it will be apparent to those who have ordinary skill in this technical area that any different types of communication interfaces can be adapted in of the present invention. In this specification, SATA is only an example for explanation.

Referring again to FIG. 1, the communication control unit 60 has a communication interface C-COMP 12, a communication interface C-ORIG 22, and a communication interface C-BACK 32 to allow communication with the computer unit 10, the original auxiliary storage device 20, and the backup auxiliary storage device 30, respectively. The SATA protocol is also applicable to the above communication interfaces. Here, since the communication interfaces are separated through the communication control unit 60, it is also possible to use auxiliary storage devices of different protocol, such as Small Computer System Interface (SCSI) and SATA.

Referring to FIG. 1, the auxiliary storage device providing the independent backup and recovery functions according to the embodiment of the present invention is configured as follows:

- The communication control unit 60 that includes the communication interface C-COMP 70 connected to the communication interface COMP 12 of the computer unit 10, the communication interface C-ORIG 80 connected to the communication interface ORIG 22 of the original auxiliary storage device 20, and the communication interface C-BACK 90 connected to the communication interface BACK 32 of the backup auxiliary storage device 30.
- The original auxiliary storage device 20 that is selectively connected to the computer unit 10 through the communication control unit 60 according to the mode selection of the user to store or provide data.
- And, the backup auxiliary storage device 30 that receives the communication between the computer unit 10 and the original auxiliary storage device 20 in real time through the communication control unit 60, that analyzes the access information of the original auxiliary storage device of the computer unit 10 to generate and record backup information, outputs a control signal for controlling the communication control unit 60, and that includes the mode switch 50 for the mode selection of the user which is connected to the input/output unit 40.

Detailed operations of the auxiliary storage device providing the independent backup and recovery functions according to the above embodiment of the present invention having such a configuration are as follows.

When the mode switch 50 is set to the normal mode, the user of the computer unit 10 may access only the original auxiliary storage device 20. In this case, the communication control unit 60 relays the communication as it is between the computer unit 10 and the original auxiliary storage device 20 and transmits a packet, which is transmitted from the computer, to the backup auxiliary storage device 30. Therefore, in this state, the backup auxiliary storage device 30 may recognize the contents of the access to the original auxiliary storage device 20 of the computer unit 10.

That is, the original auxiliary storage device 20 performs input/output of data according to the access information of the auxiliary storage device sent from the computer unit 10, and the backup auxiliary storage device 30 receives the access information and changed or stored data in real time and records the access information and data sequentially according to time.

The backup auxiliary storage device 30 records the access information of the computer unit 10 including read/write selection information and configuration information such as access time, file path and file name, and/or physical information such as a sector number, a cluster number, a cylinder number, and a head number in a list as an access record. In the case of a read operation (computer unit←auxiliary storage device), the original auxiliary storage device 20 transmits data as required by the computer unit 10, and thus an additional data backup function is not performed. However, in case of a write operation (computer unit→auxiliary storage device), a file system is changed, and thus the additional data backup function is performed. The original auxiliary storage device 20 may complete the task by changing the contents of a designated physical area, but in the backup auxiliary storage device 30, the above-described access information, to which data to be written is appended, may be stored as an access record without changing the existing contents in the designated physical area of the backup auxiliary storage device 30. That is, the access record of the original auxiliary storage device 20 of the computer unit 10 is generated and stored in the backup auxiliary storage device 30.

If there is too much data to be processed and time delay is expected, the backup auxiliary storage device 30 may notify the communication control unit 60 of such a situation using the flow control function of the SATA standards. In this case, even if there is no request from the original auxiliary storage device 20, the communication control unit 60 performs the flow control with the computer unit 10 to harmonize its processing speed of the data to the processing speed of the backup auxiliary storage device 30.

The generated access records are provided for recovery or used to delete or monitor malicious codes. For example, in case of computer unit is operated on Windows OS, when the changed data of the original auxiliary storage device 20 is an executable file such as a registry or a driver, it may be used to alert the user through the display (the input and output unit 40 of FIG. 1) or another alarm unit added to the backup auxiliary storage device 30.

Next, when the user determines that recovery needs to be performed on the computer, the user switches the mode switch 50 to the recovery mode and reboots the computer unit 10.

In this case, the access to the original auxiliary storage device 20 of the computer unit 10 is blocked and the backup auxiliary storage device 30 is connected to the computer unit 10. That is, the backup auxiliary storage device 30 checks the input of the mode switch 50 during booting and transmits the control signal to the communication control unit 60 when the recovery mode is checked. Accordingly, the access signal from the computer unit 10 is completely blocked to the original auxiliary storage device 20 and transferred only to the backup auxiliary storage device 30.

The backup auxiliary storage device 30 which is in the connected state provides backed-up booting information to the computer unit 10. That is, in the case in which there is backed-up OS information by the user at a specific time point in the past, the backup auxiliary storage device 30 provides the backed up OS information when the computer unit 10 requests the OS information for booting. Further, the backup information from the same time point as the specific time point is also provided when the computer unit 10 requests various kind of information for other application programs or for entering an initial state.

Meanwhile, when recovery of the original auxiliary storage device 20 is necessary according to the recovery mode, the backup auxiliary storage device 30 may request the communication control unit 60 to perform recovery so as to access the original auxiliary storage device 20 directly. In this case, the original auxiliary storage device 20 may be completely blocked from the computer unit 10, and the backup auxiliary storage device 30 may directly access the original auxiliary storage device 20 to perform the recovery function. The connection structure may also be used to make initial backup information when the auxiliary storage device of the existing computer is upgraded (replaced) with the device of the present invention.

Meanwhile, in the above structure, the backup auxiliary storage device 30, instead of the computer unit 10, may access the original auxiliary storage device 20 to read/write data. However, except for providing the information related to booting, a separate management or recovery program may be used to allow the computer unit 10 to access the original auxiliary storage device 20 under restricted conditions.

The user may directly recover damaged data of the original auxiliary storage device 20 using the recovery program provided by the OS or BIOS or the recovery program installed in the backup auxiliary storage device 30. When the recovery program installed in the backup auxiliary storage device 30 is used, the auxiliary storage device according to the present invention may add a separate display and input device to the input and output unit 40 so as to display a recovery time point. In this case, the user may perform recovery on the computer unit by selecting the recovery time point directly without intervention of the BIOS of the computer. In this case, the input device may consist of a keyboard interface, a mouse interface and the emulation interface for connecting those keyboard and mouse to the computer unit 10. A keyboard or mouse of the existing computer unit may physical keyboard or mouse or virtual keyboard or mouse displayed on touch screen display device of the existing computer unit. A liquid-crystal display (LCD) is suitable as a display device.

When the BIOS or the OS supports the auxiliary storage device according to the present invention, the display of the input/output unit 40 of the backup auxiliary storage device 30 described above may be omitted. In this case, the user may set the mode switch 50 to the recovery mode, boot the computer, and enter into the recovery program using a hot key designated by the BIOS or the OS during booting. For example, general PCs display a setup screen provided by the BIOS when pressing a F10 key in booting, and the recovery function of the present invention may be assigned to one of the setup screen menu.

When the OS supports the recovery, the recovery function of the present invention may be assigned to one of the Windows OS mode which can set during booting, for example, by pressing a F8 key. In this case, it is needed that a copy of the OS is in the backup auxiliary storage device 30.

When the BIOS supports the recovery, the recovery program of the BIOS and the recovery program stored in the backup auxiliary storage device 30 cooperate to perform the recovery. That is, when the recovery program of the BIOS requests detailed backup information to the backup auxiliary storage device 30, the backup auxiliary storage device 30 provides the list of the backup information stored therein on the basis of possible recovery time point, and the recovery program of the BIOS displays those information on the screen. When the user selects a recovery time point from the displayed information, the recovery program of the BIOS transfers the selected recovery time point to the backup auxiliary storage device 30. After receiving the recovery time point, the backup auxiliary storage device 30 directly accesses the original auxiliary storage device 20 to recover the file system to the selected recovery time point.

As described above, the backup information includes backup information generated at a specific back up time point and at least one access information sequentially recorded thereafter at every access moment to the original auxiliary storage device of the computer unit 10. That is, the user may return the file system of the computer to the specific time point under any circumstances. The backup information generated at a specific back up time point is a complete copy of the original auxiliary storage device 20 at that time point, and thus may be used immediately. However, since the access information is sequentially recorded from the back up time point, it may take considerable time when doing recovery using the access records. For example, in case that a file is changed nine times after a specific back up time point and the user sets the sixth changed time point as a recovery time point, the complete recovery process takes considerable time because it is necessary to review all of six access records to find out what is changed.

When the user designates or selects a specific recovery time point, the user may return the state of files of the original auxiliary storage device 20 to the state at the corresponding time point. The backup auxiliary storage device 30 may also change the basic backup information thereof to the corresponding time point. A plurality of backup time points can be set by the user.

The backup auxiliary storage device 30 may include a keyboard interface, a mouse interface and the emulation interface for connecting those keyboard and mouse to the computer unit 10. By doing this, the mode switch 50 may be assigned to a special key on the keyboard, thereby simplifying the configuration thereof. Further, even when the display is included, the input from the user may be processed in this manner. Thereby a more convenient user interface is implementable.

Figure 2:
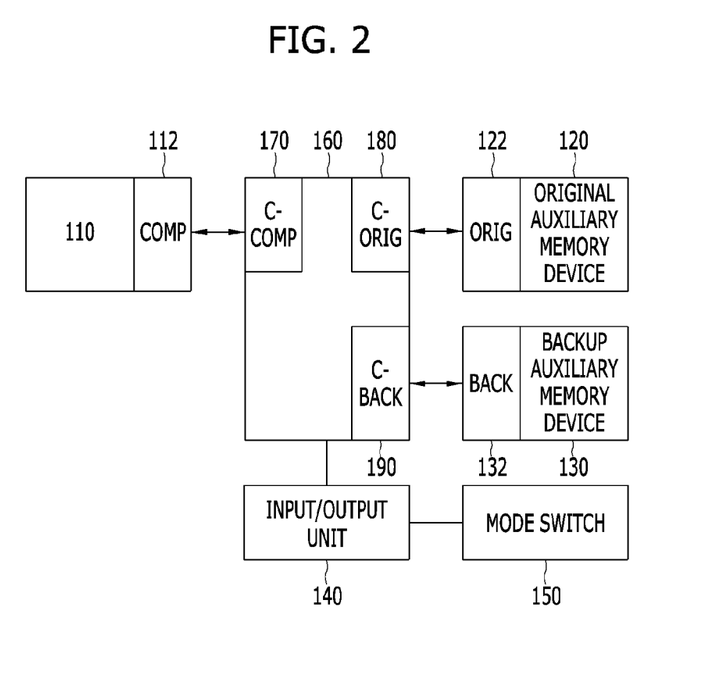
FIG. 2 is a schematic diagram of an auxiliary storage device according to another embodiment example of the present invention in which a communication control unit has a processor and performs a function of a communication gateway and a backup function.

FIG. 2 is a schematic diagram for describing a concept of an auxiliary storage device according to another embodiment of the present invention. A communication control unit 160 includes a processor to actively operate, relays and controls communication by performing a function similar to that of a communication gateway, and also performs a function of generating backup information as performed by the backup auxiliary storage device of FIG. 1. That is, in this configuration, the communication control unit 160 communicates with a computer unit 110, an original auxiliary storage device 120, and a backup auxiliary storage device 130 in one-to-one (1:1) connection and also directly performs a recovery information management task for backup. Therefore, a mode switch 150 is connected to the communication control unit 160 through the input/output unit 140. In this case, the backup auxiliary storage device 130 records or provides access records generated by the communication control unit 160 in response to a command from the communication control unit, and thus a commercial auxiliary storage device may be advantageously used as the backup auxiliary storage device 130 without change.

A difference between the configuration of FIG. 1 and the configuration of FIG. 2 is the unit performing the backup function. In the configuration of FIG. 1, the communication control unit 60 transfers the data and information of the communication between the computer unit 10 and the original auxiliary storage device 20 to the backup auxiliary storage device 30 without change, and the backup auxiliary storage device 30 analyzes those data and information to generate backup information. In the configuration of FIG. 2, the communication control unit 160 analyzes the communication between the computer unit 110 and the original auxiliary storage device 120 to generate backup information and transfers the generated backup information to the backup auxiliary storage device 130. The backup auxiliary storage device 130 only stores the backup information passively. Accordingly, in the configuration of FIG. 2, the communication control unit 160 directly receives an input of the mode selection switch 150 from the user. Since the contents of the backup and recovery in both configurations are similar, detailed descriptions will be omitted because the contents may be easily understood to a person having ordinary skill in the art Accordingly, the auxiliary storage device having independent backup and recovery functions of the present invention according to the configuration of FIG. 2 is configured as follows:

The communication control unit 160 that includes a communication interface C-COMP 170 connected to a communication interface COMP 112 of the computer unit 110, a communication interface C-ORIG 180 connected to a communication interface ORIG 122 of the original auxiliary storage device 120, and a communication interface C-BACK 190 connected to a communication interface BACK 132 of the backup auxiliary storage device 130, and an input/output unit 140 which receives the data and information between the computer unit 110 and the original auxiliary storage device 120 in real time, analyzes the communication to generate backup information, and stores the generated backup information in the backup auxiliary storage device 130, wherein the mode switch 150 for the mode selection of the user is connected to the input and output unit 140.

The original auxiliary storage device 120 that is selectively connected to the computer unit 110 according to the mode selection of the user through the communication control unit 160 to store or provide data.

And the backup auxiliary storage device 130 that is selectively connected to the computer unit 110 through the communication control unit 160 according to the mode selection of the user to provide backup data.

Figure 3A:
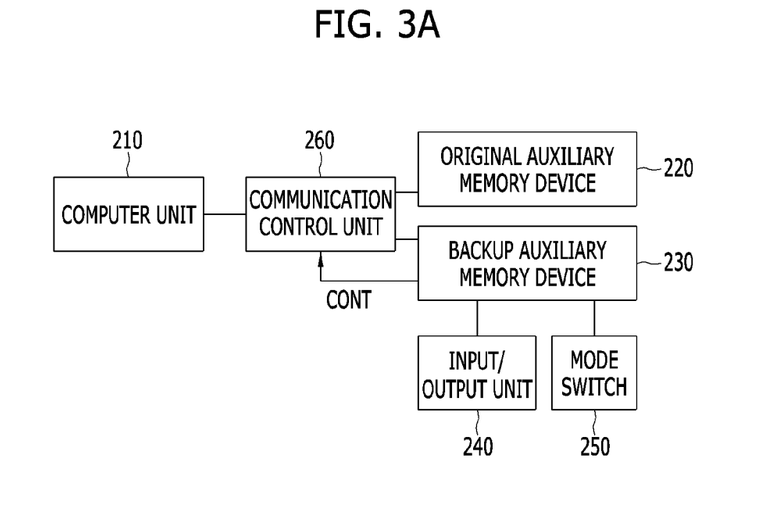
FIG. 3A is a schematic diagram of an auxiliary storage device according to still another embodiment example of the present invention in which a communication control unit has no processor.

FIG. 3A is a schematic diagram for describing a concept of an auxiliary storage device according to still another embodiment of the present invention. A communication control unit 260 functions passively without a processor. In this case, the auxiliary storage device includes an original auxiliary storage device 220 which is connected to a computer unit 210 through the communication control unit 260 to store data and provide the data, and the backup auxiliary storage device 230 which stores backup information. The communication control unit 260 receives control signals outputted from the input/output unit 240 of the backup auxiliary storage device 230 to control the communication between the computer unit 210 and the original auxiliary storage device 220 and the communication between the computer unit 210 and the backup auxiliary storage device 230.

The backup auxiliary storage device 230 also receives a signal of a mode switch 250 for selecting a normal mode or a recovery mode from the input and output unit 240. That is, an embedded processor (not illustrated) of the backup auxiliary storage device 230 receives an input of mode selection of the mode switch 250 to control the communication control unit 260 and perform a predetermined task. The input and output unit may include a display or an input key.

Users of the existing computer product can cope with infection of malicious codes by adding the device of the present invention, which consists of the communication control unit 260, the backup auxiliary storage device 230, the input and output unit 240, and the mode switch 250, to their computers. In this case, the communication control unit 260 may be placed between a main board and an auxiliary storage device of the existing computer, and the communication control unit 260 and the backup auxiliary storage device 230 may be connected and assembled as shown in FIG. 3A. Further, the computer may have the architecture when production as shown in FIG. 3A.

When the user sets the mode switch 250 to the normal mode, the communication control unit 260, which controls the communication between the computer unit 210 and the original auxiliary storage device 220 and the communication between the computer unit 10 and the backup auxiliary storage device 230, allows the computer unit 210 to access only the original auxiliary storage device 220. However, in this case, the communication control unit 260 allows the backup auxiliary storage device 230 to obtain required data. Accordingly, the computer unit 210 may freely access the original auxiliary storage device 220, and the backup auxiliary storage device 230 receives access information of the original auxiliary storage device of the computer unit 210 in real time.

Meanwhile, when the computer malfunctions due to malicious codes or other reasons and the user determines that recovery needs to be performed on the computer, the user switches the mode switch 250 to the recovery mode and reboots the computer unit 210. In this case, the communication control unit 260 blocks access to the original auxiliary storage device 220 of the computer unit 210 and connect the backup auxiliary storage device 230 to the computer unit 210, under control of the backup auxiliary storage device 230.

Operations of the communication control unit 260, the original auxiliary storage device 220, and the backup auxiliary storage device 230 will be described below.

Figure 3B:
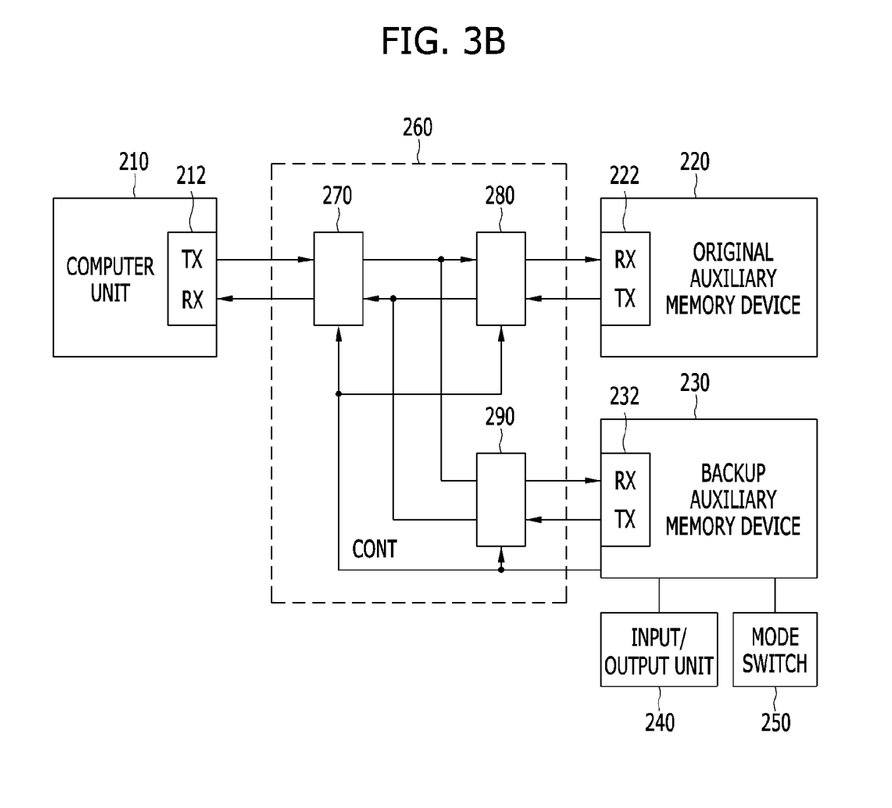
FIG. 3B is a detailed configuration diagram of the auxiliary storage device of FIG. 3A.

FIG. 3B is a configuration diagram of an auxiliary storage device according to the embodiment in which a communication control unit having no processor and controlled by backup auxiliary storage device. A configuration of a communication control unit 260 is illustrated in detail.

Referring to FIG. 3B, the auxiliary storage device providing independent backup and recovery functions according to the embodiment of the present invention is configured as follows:

No. 1 original communication control unit 270 that is connected to a communication interface 212 of a computer unit 210;

An original auxiliary storage device 220 that is connected to the computer unit 210 through the No. 1 communication interface 222 to store or provide data;

No. 2 original communication control unit 280 is connected to No. 1 communication interface 222 in the original auxiliary storage device 220 and connected to No. 1 original communication control unit 270;

A backup communication control unit 290 that is connected in parallel between the No. 1 original communication control unit 270 and the No. 2 original communication control unit 280; and A backup auxiliary storage device 230 that consists of the No. 2 communication interface 232 connected to the backup communication control unit 290 to store or provide data through the No. 2 communication interface 232, and an input/output unit 240 which outputs control signals for controlling the No. 1 original communication control unit 270, the No. 2 original communication control unit 280, and the backup communication control unit 290, wherein a mode switch 250 for mode selection of a user is connected to the input/output unit 240.

Here, the No. 1 original communication control unit 270, the No. 2 original communication control unit 280, and the backup communication control unit 290 are intended to use for retransmission and interruption of signals and thus may be easily implemented with a repeater circuit or branch circuit consisted of a multiplexer, a relay (mechanical, semiconductor), a line driver, or the like.

Operations of the auxiliary storage device providing independent backup and recovery functions according to the embodiment of the present invention having such a configuration are as follows.

Figure 4:
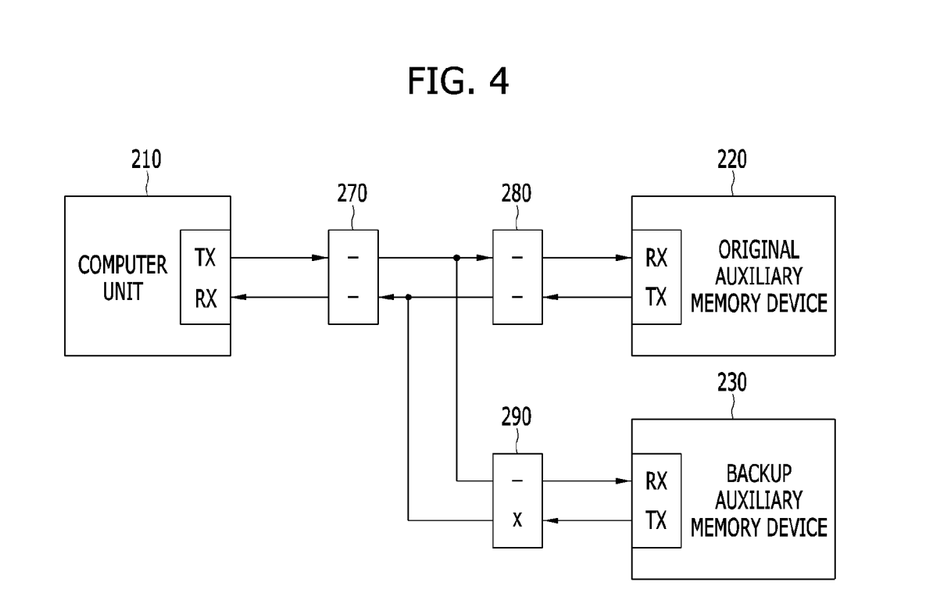
FIG. 4 is an explanatory diagram of an operation in a normal mode of the auxiliary storage device of FIGS. 3A and 3B.

When the mode switch 250 is set to a normal mode, the computer unit 210 accesses only the original auxiliary storage device 220. For this operation, as illustrated in FIG. 4, all lines of the No. 1 and No. 2 original communication control units 270 and 280 are connected (i.e., the TX line of the computer unit 210 is connected to the RX line of the original auxiliary storage device 220, and the RX line of the computer unit 210 is connected to the TX line of the original auxiliary storage device 220), the backup communication control unit 290 blocks the RX line of the computer unit 210 and the TX line of the backup auxiliary storage device 230 and connects the TX line of the computer unit 210 to the RX line of the backup auxiliary storage device 230. Therefore, in this state, the backup auxiliary storage device 230 may recognize the access to the original auxiliary storage device 220 of the computer unit 210.

That is, the original auxiliary storage device 220 performs input and output of data according to the access information of the auxiliary storage device sent from the computer unit 210, and the backup auxiliary storage device 230 receives both the access information of the original auxiliary storage device 220 sent from the computer unit 210 and the changed or stored data in real time, and records the access information and data sequentially at every access moment.

The process in which the computer unit 210 communicates with the original auxiliary storage device 220 is as follows. In the normal operation state, all of the lines of the No. 1 and No. 2 original communication control units 270 and 280 are connected so that the computer unit 210 may freely access the original auxiliary storage device 220. Only the TX line outputted from the computer unit 210 is connected to the line of the backup communication control unit 290, which is connected to the RX line of the backup auxiliary storage device 230. As a result, the backup auxiliary storage device 230 can receive the access information for the original auxiliary storage device 220 of the computer in real time.

The backup auxiliary storage device 230 obtains at least one of read/write selection information and configuration information such as access time, file path and file name, or physical information such as a sector number, a cluster number, a cylinder number, and a head number as an access information of the computer unit 210, and record the access information in an access record list. In the case of a read operation (computer unit←auxiliary storage device), the original auxiliary storage device 220 transmits information as required by the computer unit 210, and thus an additional backup function is not performed. However, in a write operation (computer unit→auxiliary storage device), a file system is changed, and thus the backup function is performed. The original auxiliary storage device 220 may complete the task by changing the contents of a designated physical area. The backup auxiliary storage device 230, obtains and records the above-described access information and data to be written in the access record list. The content of the designated physical area in the backup auxiliary storage device 230 is not changed. That is, the access record of the original auxiliary storage device 220 of the computer unit 210 is generated and stored in the backup auxiliary storage device 230.

The generated access records are provided for recovery or used to delete or monitor malicious codes. For example, in the Windows OS, when the changed data of the original auxiliary storage device 220 is an executable file such as a registry or a driver, it may be used to alert the user through the display (the input and output unit 240 of FIG. 3A) or another alarm unit of the backup auxiliary storage device 230.

When the computer malfunctions due to malicious codes or other reasons and the user determines that recovery needs to be performed on the computer, the user switches the mode switch 250 to the recovery mode and reboots the computer unit 210. In this case, there are two possible cases.

Figure 5:
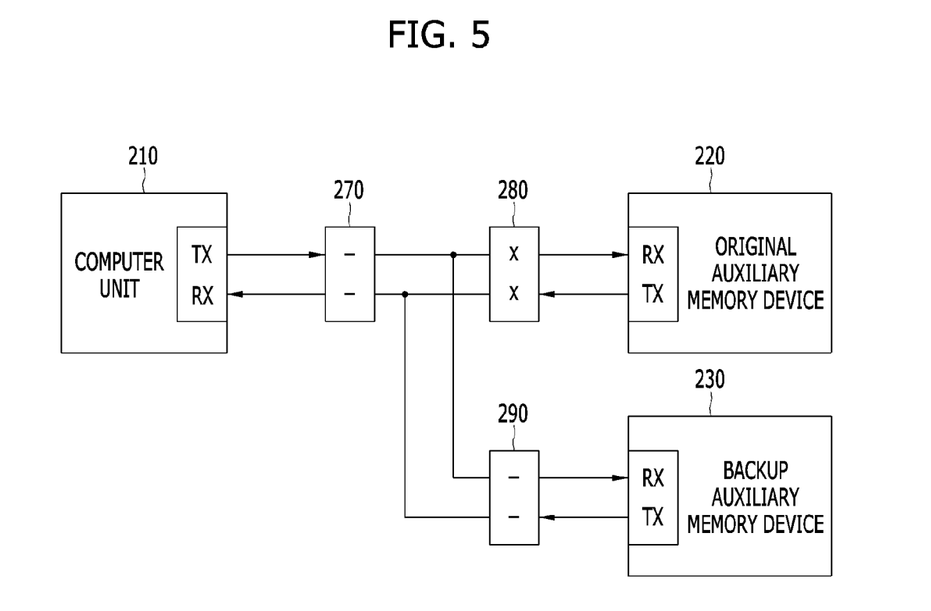
FIG. 5 is an explanatory diagram of an operation in a recovery mode of the auxiliary storage device of FIGS. 3A and 3B.

In one case, the access to the original auxiliary storage device 220 of the computer unit 210 is blocked and the backup auxiliary storage device 230 is connected to the computer unit 210. In detail, the backup auxiliary storage device 230 checks the input of the mode switch 250 during every booting. When the recovery mode is checked, the communication line of the No. 1 original communication control unit 270 is connected, the communication line of the No. 2 original communication control unit 280 is disconnected, and the line of the backup communication control unit 290 is connected as illustrated in FIG. 5, under control of the backup auxiliary storage device 230. As a result, the original auxiliary storage device 220 is completely blocked from the computer unit 210, and the backup communication control unit 290 is connected to the computer unit 210.

The backup auxiliary storage device 230 which is in the connected state provides backed-up booting information to the computer unit 210. That is, in the case in which there is OS information which is backed up by the user from a specific time point, the backup auxiliary storage device 230 provides the backed up OS information when the computer unit 210 requests the OS information for booting. Further, the backup information at the same time point as the specific time point is also provided according to the computer unit's 210 requests, various kinds of information for application programs or for entering an initial state.

Figure 6:
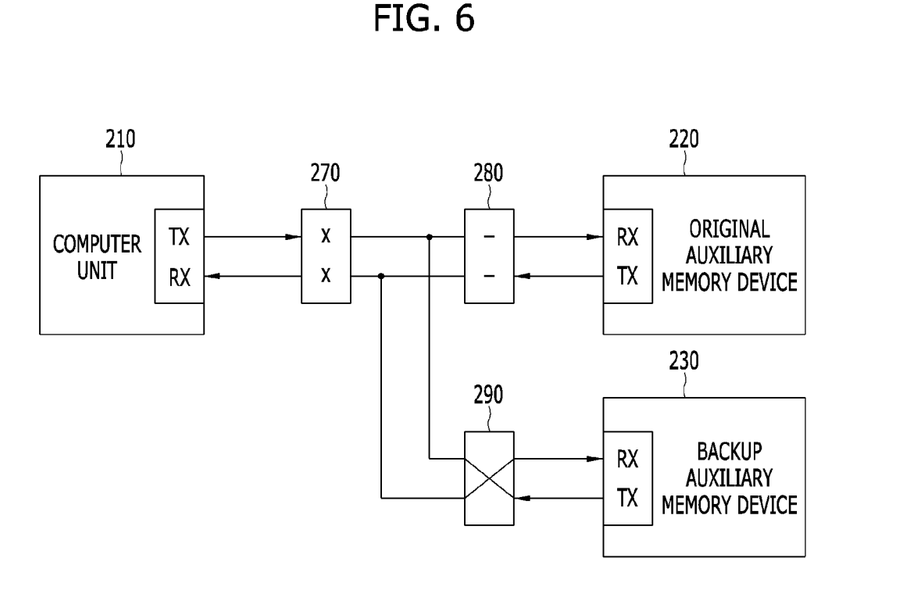
FIG. 6 is another explanatory diagram of an operation in a recovery mode of the auxiliary storage device of FIGS. 3A and 3B.

In the other case, as illustrated in FIG. 6, the original auxiliary storage device 220 may be completely blocked from the computer unit 210, and the backup auxiliary storage device 230 may directly access the original auxiliary storage device 220 to perform the recovery function. In detail, the TX and RX communication lines between the No. 1 original communication control unit 270 and the computer unit 210 are disconnected, and the No. 2 original communication control unit 280 and the backup communication control unit 290 are controlled so as that the lines are connected to cross each other so that the RX and TX lines of the original auxiliary storage device 220 and the backup auxiliary storage device 230 cross each other. The above connection structure may be used to make initial backup information at the first time when the auxiliary storage device of the existing computer is upgraded (replaced) with the device of the present invention as well as recovery.

In the above structure, the backup auxiliary storage device 230 controls the No. 1 and the No. 2 original communication control units 270 and 280 and the backup communication control unit 290 to allow the original auxiliary storage device 220 to recognize the backup auxiliary storage device 230 as a computer unit 210. As a result, the backup auxiliary storage device 230 may request the original auxiliary storage device 220 to store or provide data like the computer unit 210. Therefore, the user may directly recover damaged data of the original auxiliary storage device 220 using the recovery program provided by the OS or BIOS or the recovery program installed in the backup auxiliary storage device 230. When the recovery program installed in the backup auxiliary storage device 230 is used, it is preferable that the auxiliary storage device according to the present invention—includes a separate display and input device to the input/output unit 240 so as to display a recovery time point. In this case, the user may perform recovery on the computer by selecting the recovery time point directly without intervention of the BIOS of the computer. In this case, the input device may consist of a keyboard interface, a mouse interface and the emulation interface for connecting those keyboard and mouse to the computer unit 210. An LCD is suitable as a display device.

Meanwhile, in such a connection state, the stored information on the original auxiliary storage device may be provided to the user under the control of the backup auxiliary storage device 230. The computer unit 210 may send commands in addition to the file read or write command to the backup auxiliary storage device 230, by writing or reading data to a specific file or a specific sector of the backup auxiliary storage device 230 For example, if there is a file (e.g. recover.dat) and a protocol is provided, and if the recovery program of the computer unit 210 writes information on the above file about the file to be recovered and a recovery time point, the backup auxiliary storage device 230 may read the written information on the above file and recover the original auxiliary storage device 220 using the backup information. Further, if a separate communication protocol is provided, it is also possible that the computer unit 210 directly communicate with the backup auxiliary storage device 230 to process the above tasks. However, in this case, a separate communication protocol should be applied in a manner supported by the BIOS or the OS.

When the BIOS or the OS of the computer unit 210 supports the auxiliary storage device according to the present invention, the display serving as the input/output unit 240 of the backup auxiliary storage device 230 described above may be omitted. In this case, the user may set the mode switch 250 to the recovery mode, boot the computer, and move to the recovery program using a hot key designated by the BIOS or the OS during booting. For example, ordinary PCs enter setup mode and display a setup screen provided by the BIOS when pressing a F10 key during booting process, and the recovery function of the present invention may be assigned to one of the setup screen menu. When the OS supports the recovery such like in Windows, the recovery function of the present invention may be assigned to one of menus related to booting mode entered by pressing a F8 key. For above, a copy of the OS should remain in the backup auxiliary storage device 230.

Meanwhile, when the BIOS program supports the recovery process, the recovery program of the BIOS and the backup auxiliary storage device 230 cooperate to perform the recovery. When the recovery program of the BIOS requests detailed backup information to the backup auxiliary storage device 230, the backup auxiliary storage device 230 lists the backup information stored therein on the basis of possible recovery time points, and the recovery program of the BIOS displays those information on the screen. When the user selects a recovery time point from the displayed information, the recovery program of the BIOS transfers the selected recovery time point to the backup auxiliary storage device 230. After receiving the recovery time point, the backup auxiliary storage device 30 directly accesses the original auxiliary storage device 220 to recover the file system to the selected recovery time point.

As described above, the backup information includes backup information generated at a specific back up time point and at least one access information sequentially recorded thereafter at every access moment to the original auxiliary storage device of the computer unit 210. That is, the user may return the file system of the computer to the specific time point under any circumstances. The backup information generated at a specific back up time point is a complete copy of the original auxiliary storage device 220 at that time point, and thus may be used immediately. However, since the access information is sequentially recorded from the back up time point, it may take considerable time when doing recovery using the access records. For example, in case that a file is changed nine times after a specific back up time point and the user sets the sixth changed time point as a recovery time point, the complete recovery process takes considerable time because it is necessary to review all of six access records to find out what is changed Meanwhile, when the user designates or selects a specific recovery time point, the user may return the state of files of the original auxiliary storage device 220 to the state at the corresponding time point. The backup auxiliary storage device 230 may also change the basic backup information thereof to the corresponding time point. It is possible to set a plurality of backup time points by the user.

Since backup requires a lot of storage space under any circumstances, the backup auxiliary storage device 230 should have sufficient capacity, and it is preferable to provide a communication buffer having sufficiently large capacity because no data loss should occur due to a slow processing speed.

Meanwhile, when the backup auxiliary storage device 230 may include a keyboard interface, a mouse interface and the emulation interface for connecting those keyboard and mouse to the computer unit 210. By doing this, the mode switch 250 may be assigned to a special key on the keyboard, thereby simplifying the configuration thereof. Further, even when the display is included, the input from the user may be processed in this way. Thereby a more convenient user interface is implementable.

According to the present invention, various types of computer units having the auxiliary storage device such as PCs, laptop computers, tablet PCs, and mobile phones, etc. can automatically data backup without changing existing architecture. The original data can be recovered from a specific time point designated by the user using the backed-up data through a simple operation when the data of the auxiliary storage device is damaged. The recovery function of the original auxiliary storage device can be performed by rebooting using the backed-up OS information stored in the backup auxiliary storage device as necessary, and the influence on the access time of the original auxiliary storage device can be minimized.

Non-limiting exemplary embodiments of the present invention have been described above. The embodiments may be intentionally deformed, changed, and modified within the scope of the appended claims without departing from the spirit and essence of the present invention.

The invention claimed is:

1. An auxiliary storage device providing independent backup and recovery functions, the auxiliary storage device comprising:
    an original auxiliary storage device which is connected to a computer unit through a communication control unit to store and provide data; and
    a backup auxiliary storage device,
    wherein the communication control unit comprises a processor to control communication between the computer unit and the original auxiliary storage device and communication between the computer unit and the backup auxiliary storage device,
    wherein the backup auxiliary storage device comprises an input/output unit for controlling the communication control unit by an input and output of a user, and,
    a mode switch which is connected to the input/output unit and configured to allow the user to select a normal mode or a recovery mode, and, where in the processor of the communication control unit receives the input signals from the user and from the mode selection of the mode switch through the backup auxiliary storage device, and controls the communication between the computer unit and the original auxiliary storage device and the communication between the computer unit and the backup auxiliary storage device.

2. The auxiliary storage device according to claim 1, wherein, when the user sets the mode switch to the normal mode, the communication control unit operates so that the computer unit only accesses the original auxiliary storage device and controls so that the backup auxiliary storage device recognizes communication information including contents transmitted from the computer unit to the original auxiliary storage device.

3. The auxiliary storage device according to claim 1, wherein, when the user sets the mode switch to the recovery mode and reboots the computer unit, the communication control unit operates so that access to the original auxiliary storage device of the computer unit is blocked and the backup auxiliary storage device is connected to the computer unit.

4. The auxiliary storage device according to claim 1, wherein:
    the backup auxiliary storage device analyzes the stored backup information and transmit information about selectable recovery time points to the computer unit,
    the computer unit provides the above transmitted information about the selectable recovery time points to the user, and after the user selects one of the selectable recovery time points, transfers that information about selected recovery time point to the backup auxiliary storage device, and,
    the backup auxiliary storage device recovers a file system of the original auxiliary storage device on the basis of the received information on the selected recovery time point.

5. The auxiliary storage device according to claim 1, wherein the backup auxiliary storage device further comprises at least one selected from a display, a keyboard, and a mouse.

6. An auxiliary storage device providing independent backup and recovery functions, the auxiliary storage device comprising:
    an original auxiliary storage device which is connected to a computer unit through a communication control unit to store and provide data; and
    a backup auxiliary storage device, wherein the communication control unit comprises a processor to control communication between the computer unit and the original auxiliary storage device and communication between the computer unit and the backup auxiliary storage device, and, an input/output unit which is configured to receive the input and output of a user, and a mode switch which is connected to the above input/out unit and configured to allow the user to select a normal mode or a recovery mode, and, the processor of the communication control unit receives an input signal from the user and an input of mode selection of the mode switch and controls the communication between the computer unit and the original auxiliary storage device and the communication between the computer unit and the backup auxiliary storage device to perform a backup function of the backup auxiliary storage device.

7. The auxiliary storage device according to claim 6, wherein, when the user sets the mode switch to the normal mode, the communication control unit operates so that the computer unit only accesses the original auxiliary storage device and controls so that the backup auxiliary storage device recognizes communication information including contents transmitted from the computer unit to the original auxiliary storage device.

8. The auxiliary storage device according to claim 6, wherein, when the user sets the mode switch to the recovery mode and reboots the computer unit, the communication control unit operates so that access to the original auxiliary storage device of the computer unit is blocked and the backup auxiliary storage device is connected to the computer unit.

9. The auxiliary storage device according to claim 6, wherein:

the backup auxiliary storage device analyzes the stored backup information and transmit information about selectable recovery time points to the computer unit, the computer unit provides the above transmitted information about the selectable recovery time points to the user using, and after the user selects one of the selectable recovery time points, transfers that information about selected recovery time point to the backup auxiliary storage device, and, the backup auxiliary storage device recovers a file system of the original auxiliary storage device on the basis of the received information on the selected recovery time point.

10. The auxiliary storage device according to claim 6, wherein the backup auxiliary storage device further comprises at least one selected from a display, a keyboard, and a mouse.

11. An auxiliary storage device providing independent backup and recovery functions, the auxiliary storage device comprising:

an original auxiliary storage device which is connected to a computer unit through a communication control unit to store and provide data; and a backup auxiliary storage device, wherein the backup auxiliary storage device comprises, an input/output unit which is configured to receive the input and output of a user and control the communication control unit, a mode switch which is configured to allow the user to select a normal mode or a recovery mode, and, wherein the communication control unit has no processor and controls communication between the computer unit and the original auxiliary storage device and communication between the computer unit and the backup auxiliary storage device using the control signal outputs from the backup auxiliary storage device, and, a backup auxiliary storage device performs the task for controlling the communication control unit, and outputs data to be shown to the user.

12. The auxiliary storage device according to claim 11, wherein, when the user sets the mode switch to the normal mode, the communication control unit operates so that the computer unit only accesses the original auxiliary storage device and controls so that the backup auxiliary storage device recognizes communication information including contents transmitted from the computer unit to the original auxiliary storage device.

13. The auxiliary storage device according to claim 11, wherein, when the user sets the mode switch to the recovery mode and reboots the computer unit, the communication control unit operates so that access to the original auxiliary storage device of the computer unit is blocked and the backup auxiliary storage device is connected to the computer unit.

14. The auxiliary storage device according to claim 11, wherein:

the backup auxiliary storage device analyzes the stored backup information and transmit information about selectable recovery time points to the computer unit, the computer unit provides the above transmitted information about the selectable recovery time points to the user, and after the user selects one of selectable recovery time points, transfers that information about selected recovery time point to the backup auxiliary storage device, and, the backup auxiliary storage device recovers a file system of the original auxiliary storage device on the basis of the received information on the selected recovery time point.

15. The auxiliary storage device according to claim 11, wherein the backup auxiliary storage device further comprises at least one selected from a display, a keyboard, and a mouse.

* * * * *